H. FRESH.
WORM GEARED HAND BRAKE.
APPLICATION FILED APR. 2, 1912.
1,035,340.
Patented Aug. 13, 1912.
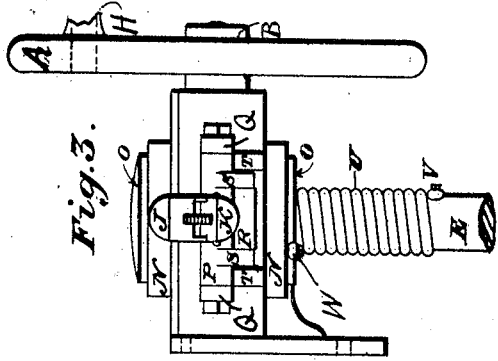
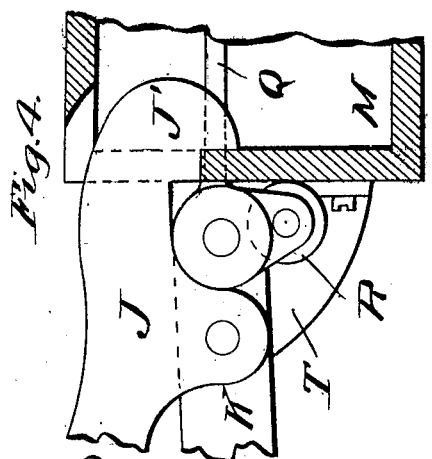
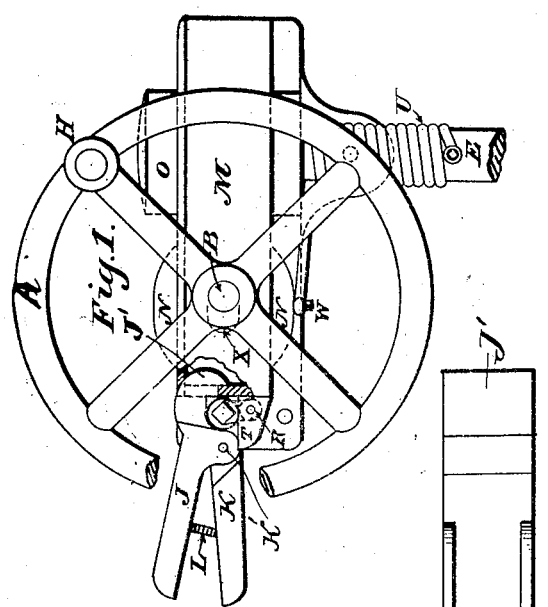
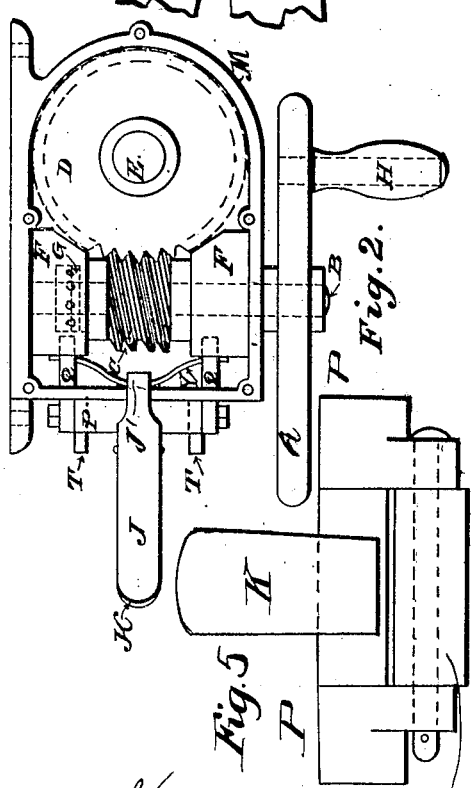
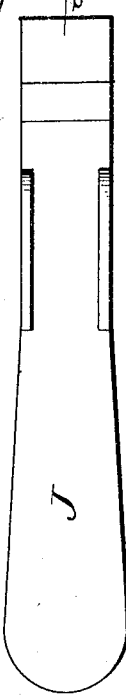
WITNESSES:
C. M. Catlin
Theo H Sarr
INVENTOR.
Henry Fresh
BY
Benj. R. Catlin
ATTORNEY.

UNITED STATES PATENT OFFICE.

HENRY FRESH, OF FROSTBURG, MARYLAND.

WORM-GEARED HAND-BRAKE.

1,035,340.  Specification of Letters Patent.  Patented Aug. 13, 1912.

Application filed April 2, 1912. Serial No. 687,973.

*To all whom it may concern:*

Be it known that I, HENRY FRESH, a resident of Frostburg, in the county of Allegany and State of Maryland, have invented certain new and useful Improvements in Worm-Geared Hand-Brakes; and I do hereby declare the following to be a full, clear, and exact description of the invention, such as will enable others skilled in the art to which it pertains to make and use the same.

This invention relates to improved means for operating hand-brakes for electric, steam or other cars.

The main object of the invention is to provide means of great efficiency and simplicity of construction and which shall increase the leverage of the operator several times over that utilized by direct operated hand brakes, and which means shall hold at any point where it is set without the use of dogs and ratchets, and insure perfect control and smooth running of the car.

The invention consists in the construction hereinafter described and particularly pointed out in the claims.

In the accompanying drawing which illustrates the invention and forms part of the specification;—Figures 1, 2 and 3 are respectively side, plan, and end elevation of the outer or upper end of a brake staff with the improved operating means combined therewith. Fig. 4 is an enlarged side elevation of a grip device; Fig. 5 is an end view of the lower member of the grip; and Fig. 6 is a bottom plan of the upper member of the grip.

In the drawing A represents a hand wheel, B a shaft for a worm C for operating a wheel D fixed to the upper end of a brake staff E. The brake shoe and the connection between it and the staff not being of the present invention are not shown.

F, F denote sliding bearings for the worm shaft, and G a worm-shaft thrust collar inserted into the rear bearing F, and H a handle on the hand-wheel.

J denotes the upper member of a hand-operated shifting lever, and K the lower member of the same. L is a compression spring between said members.

M denotes a case for the gears and N a housing over the worm. The rear side of the casing has a flange by means of which the casing can be secured directly to the wall of a car and thus the brake staff can be placed within about four inches of the wall thereby giving about ten inches more room in the vestibule than usual.

O, O are bosses on the case to form bearings between the case and the staff E.

P is the pivot member for the lever K. Lever or member K is secured directly to the part P, and lever or member J is indirectly carried thereby, being pivoted to the lower member at K'. As shown, and as preferred, member K is in the form of an angle lever, one leg of which constitutes a handle and the other leg of which carries the roller R. Member J at its inner end has a hook J' which normally extends through a hole in the case and engages the end wall of the case as shown in Fig. 1. This locks member K.

Q, Q are eye-bolts or similar devices forming a working connection between bearings F and the pivot member P of the lever K.

R is a roller on the lever K adapted to bear against the end of the case M.

T, T are brackets extending from case M carrying the lever K by its pivot members P. A torsion spring U is connected at V to the staff and at W to the case M (and thus to the car wall to retrieve and take up the slack chain). In other words, when the brake has been applied by turning the worm, and is then released and moved back from the car wheels as usual, there will be a little slack in the brake-operating chain (not shown). The spring U is so arranged as to act on the brake staff in the direction to take up such slack. The case is slotted at X to permit the shaft B to be moved to the left sufficiently to disengage the worm from the wheel D.

Y denotes a compression spring pressing the bearings F toward the wheel D to automatically reëngage the worm and wheel when the former is released by the operator.

In operation the wheel A is turned to the right or to the left as required for operating the brake, driving the worm C in gear with wheel D to strongly and easily turn the staff E to apply the brake (not shown) or to turn the staff reversely. For instant release of the staff and brake when starting the car, for example, or when operating the car from the opposite end, the worm is disengaged by pressing down first on member J to disengage its hook, then on member K which acting through roller R, against the case moves the part P to the left on the brackets T, thus through the connections Q, Q, moving the bearings F and the worm to the left and disengaging the worm and worm wheel. The lever-members J and K being pivoted together, J first moves alone and then both J and K move together, the friction of the latter movement being reduced by action of the roller R against the case. The hubs of the wheel D journal in bosses O. Staff E is secured to wheel D by pins or otherwise. The worm can be held disengaged by pulling members J, K down to a perpendicular position, thus causing roller R to pass a center line in its bearing on the case whereby the spring Y cannot move the worm to the right when the operator releases his hold on the grip handle.

Without limiting myself to all the details of construction above set forth, what I claim and desire to secure by Letters Patent of the United States is:—

1. The combination with a brake staff, of a worm wheel secured thereto, a worm shaft, a worm on said shaft adapted to turn said wheel and staff, a brake handle for turning said worm shaft, and means comprising an operating lever near to said handle and operable by a brakeman when the latter is in braking position for throwing the worm and worm wheel into or out of engagement.

2. The combination with a staff or shaft, of a worm wheel secured thereto, a worm adapted to move to and from the wheel, and means for normally holding the worm in engagement and for releasing the same at will, a spring tending to hold the worm in engagement, and a lever for moving the worm out of engagement after its release.

3. The combination of a brake staff, a worm wheel secured thereto, a worm and shaft, movable bearings for the shaft, a lock, and a moving device for said bearings.

4. The combination of a brake staff, a worm wheel secured thereto, a worm and shaft, movable bearings for the shaft, and a lock and moving means for said bearings comprising pivoted members adapted to operate successively.

5. The combination of a brake staff, a case through which the staff extends, a wheel on the staff within the case, a worm also in the case for driving the wheel and staff, a worm shaft distinct from the brake staff, and a spring secured at one end to the staff and at the other end to a fixed part whereby when the brake is applied and then released said spring acts to take up any undue slackness in the brake chain.

6. The combination with a staff, of operating means for the staff comprising a casing, a gear therein on the staff, a coöperating gear in the casing, a shaft for the coöperating gear distinct from the staff, movable bearings for said shaft, and a hand lever operable outside the casing adapted to disengage the said gears at will.

7. The combination with a staff, of operating means for the staff comprising a casing into which the staff extends, a gear wheel in the casing on the staff, a coöperating gear in the casing, a shaft for said gear, movable bearings for said shaft, a hand lever operatively connected to said bearings, and brackets on which the hand lever can turn and slide in the act of moving said bearings.

8. The combination, with a brake staff, of operating means comprising a casing, gearing therein, movable bearings, an angle lever adapted to move one member of said gearing to disengage it from the other member, bearings T on which the angle lever can move, and a locking and releasing member pivoted to the angle lever.

9. A worm-geared hand-brake comprising, in combination, an upright brake staff, a case at the top of the staff in which said staff has a bearing, a worm gear wheel fixed on said staff in said case, a coöperating worm and its shaft also in said case, an exterior handle for said shaft, and means within direct reach and control of an operator of said handle for engaging or disengaging said worm and worm wheel.

10. A worm-geared hand-brake comprising, in combination, an upright brake staff, a worm wheel on said staff at its top, a horizontal shaft, a worm on said shaft, said shaft and worm being also at the top of the staff and the worm adapted to drive the worm wheel and staff, and means within direct reach and control of an operator of said worm and shaft adapted to put said worm and worm wheel into or out of gear at will.

In testimony whereof, I have signed this specification in the presence of two subscribing witnesses.

HENRY FRESH.

Witnesses:
JOSEPH H. LIPPOLD,
W. C. CONLEY.

---

Copies of this patent may be obtained for five cents each, by addressing the "Commissioner of Patents, Washington, D. C."